(12) United States Patent
Kwon et al.

(10) Patent No.: US 8,181,308 B2
(45) Date of Patent: May 22, 2012

(54) WIPER FOR VEHICLE HAVING IMPROVED ASSEMBLING EFFICIENCY AND REDUCED WEIGHT

(75) Inventors: Hyuk Bai Kwon, Incheon (KR); Young Eun Cho, Incheon (KR)

(73) Assignee: Dongyang Mechatronics Corp. (KR)

( * ) Notice: Subject to any disclaimer, the term of this patent is extended or adjusted under 35 U.S.C. 154(b) by 0 days.

(21) Appl. No.: 12/948,513

(22) Filed: Nov. 17, 2010

(65) Prior Publication Data

US 2011/0131750 A1    Jun. 9, 2011

(30) Foreign Application Priority Data

Dec. 7, 2009   (KR) .................... 20-2009-0015874 U

(51) Int. Cl.
*B60S 1/38* (2006.01)

(52) U.S. Cl. ............. 15/250.46; 15/250.44; 15/250.361; 15/250.32

(58) Field of Classification Search ............. 15/250.361, 15/250.43, 250.44, 250.46, 250.32
See application file for complete search history.

(56) References Cited

U.S. PATENT DOCUMENTS

| | | | | |
|---|---|---|---|---|
| 4,675,934 A | * | 6/1987 | Dal Palu | 15/250.46 |
| 4,852,206 A | * | 8/1989 | Fisher | 15/250.201 |
| 4,896,987 A | * | 1/1990 | Pethers | 403/24 |
| 4,953,251 A | * | 9/1990 | Chow | 15/250.46 |
| 5,493,750 A | * | 2/1996 | Bollen et al. | 15/250.452 |
| 5,819,362 A | * | 10/1998 | Charng | 15/250.201 |
| 6,393,654 B2 | * | 5/2002 | Nacamuli | 15/250.46 |

FOREIGN PATENT DOCUMENTS

FR          2600292      * 12/1987

* cited by examiner

*Primary Examiner* — Gary Graham
(74) *Attorney, Agent, or Firm* — St. Onge Steward Johnston & Reens LLC

(57) ABSTRACT

A wiper for a vehicle including: a wiper stripe; a plurality of supports combined with the wiper strip; first and second yokes slidably supporting the plurality of supports; a first auxiliary lever having one end combined with a middle portion of the first yoke; a second auxiliary lever having one end combined with a middle portion of the second yoke; and a primary lever having one end combined with the first auxiliary lever and another end combined with the second auxiliary lever and including an arm combination hole in which a wiper arm is combined with a center of the primary lever, wherein the primary lever is combined with the first auxiliary lever and the second auxiliary lever, the first auxiliary lever and the first yoke are combined with each other, and the second auxiliary lever and the second yoke are combined with each other.

3 Claims, 5 Drawing Sheets

WIPER FOR VEHICLE HAVING IMPROVED ASSEMBLING EFFICIENCY AND REDUCED WEIGHT

CROSS-REFERENCE TO RELATED APPLICATIONS

This application claims the benefit of Korean Utility-model Application No. 20-2009-0015874, filed on Dec. 7, 2009, in the Korean Intellectual Property Office, the disclosure of which is incorporated herein in its entirety by reference.

FIELD OF THE INVENTION

The present invention relates to a wiper for a vehicle having improved assembling efficiency of components and reduced weight.

BACKGROUND OF THE INVENTION

Generally, in a wiper assembly, a motor drives a link device connected to a body of a vehicle and connected to a wiper arm, and the link device makes a repeated reciprocating motion, so as to remove foreign substances on a windshield or rear window of the vehicle.

The wiper assembly is an essential component for safely driving the vehicle.

In a conventional wiper, a pair of supports made of metal are combined with a wiper strip made of rubber. The pair of supports are supported by a plurality of yokes. The plurality of yokes are connected to each other by a plurality of auxiliary levers.

However, in the conventional wiper, the yokes and the auxiliary levers are rotatably combined with one another or the auxiliary levers are rotatably combined with one another by using a pin or rivet. A spacer having a low coefficient of friction or the like is combined with a portion in which the yokes and the auxiliary levers are rotatably combined with one another or in which the auxiliary levers are rotatably combined with one another by using a pin or rivet, so as to reduce a frictional resistance. Thus, the number of components that constitute one wiper may be between 15 and 20. Also, in the conventional wiper, a primary lever and an auxiliary lever each formed of metal are used. Thus, the conventional wiper may be heavy. The conventional wiper having a large number of components and being heavy gives rise to an increased load on a wiper arm as well as an increased load on a window of a vehicle when the wiper is installed to the vehicle, causes malfunction and adversely affects the reliability of the wiper. Thus, a wiper that is light and that has improved assembling efficiency needs to be developed.

SUMMARY OF THE INVENTION

The present invention provides a wiper for a vehicle having improved assembling efficiency and reduced weight, in which the number of components of the wiper is remarkably reduced compared to a conventional wiper for a vehicle.

According to an aspect of the present invention, there is provided a wiper for a vehicle having improved assembling efficiency and reduced weight, the wiper including: a wiper strip disposed in sliding contact with a glass pane of a vehicle and for removing foreign substances on the glass pane; a plurality of supports combined with the wiper strip, disposed in a lengthwise direction of the wiper strip and having elasticity; a first yoke slidably supporting the plurality of supports on ends of the first yoke; a second yoke disposed separate from the first yoke and slidably supporting the supports on ends of the second yoke; a first auxiliary lever having one end combined with a middle portion of the first yoke in such a way that the first auxiliary lever is able to be rotated relative to the first yoke and another end slidably supporting one end of the supports; a second auxiliary lever having one end combined with a middle portion of the second yoke in such a way that the second auxiliary lever is able to be rotated relative to the second yoke and another end slidably supporting one end of the supports; and a primary lever having one end combined with the first auxiliary lever in such a way that the primary lever is able to be rotated relative to the first auxiliary lever and another end combined with the second auxiliary lever in such a way that the primary lever is able to be rotated relative to the second auxiliary lever and including an arm combination hole in which a wiper arm is combined with a center of the primary lever, wherein the primary lever is combined with the first auxiliary lever and the second auxiliary lever, the first auxiliary lever and the first yoke are combined with each other, the second auxiliary lever and the second yoke are combined with each other, the first yoke and the second yoke each include a through hole by which the first yoke and the second yoke are combined with the first auxiliary lever and the second auxiliary lever, respectively, the first yoke and the second yoke accommodate portions of the wiper strip and the supports, and a combination protrusion protruding from sidewalls of inner circumferences of the first auxiliary lever and the second auxiliary lever toward the through hole is formed to be elastically accommodated in the through hole.

The primary lever may include a pair of protrusion combination portions extending from an upper portion of an inner circumference of the ends of the primary lever to a lower portion thereof, and the first auxiliary lever and the second auxiliary lever each may include an accommodation hole in which the protrusion combination portion is accommodated.

The pair of protrusion combination portions each may include: a protrusion accommodation portion formed concavely at a side surface of one protrusion combination portion; and a protrusion protruding from a side surface of the accommodation hole toward the protrusion accommodation portion.

The wiper may further include: a cover combination portion protruding from sidewalls of the arm combination hole in a vertical direction; and a cover having a hole of which one side to be combined with the cover combination portion is opened, wherein a cross-section of the cover combination portion is non-circular, and the non-circular cross-section tapers in a direction in which the cover is combined with the cover combination portion.

BRIEF DESCRIPTION OF THE DRAWINGS

The above and other features and advantages of the present invention will become more apparent by describing in detail exemplary embodiments thereof with reference to the attached drawings in which:

FIG. 1 is

DETAILED DESCRIPTION OF THE INVENTION

The present invention will now be described more fully with reference to the accompanying drawings, in which exemplary embodiments of the invention are shown.

Figure 1:
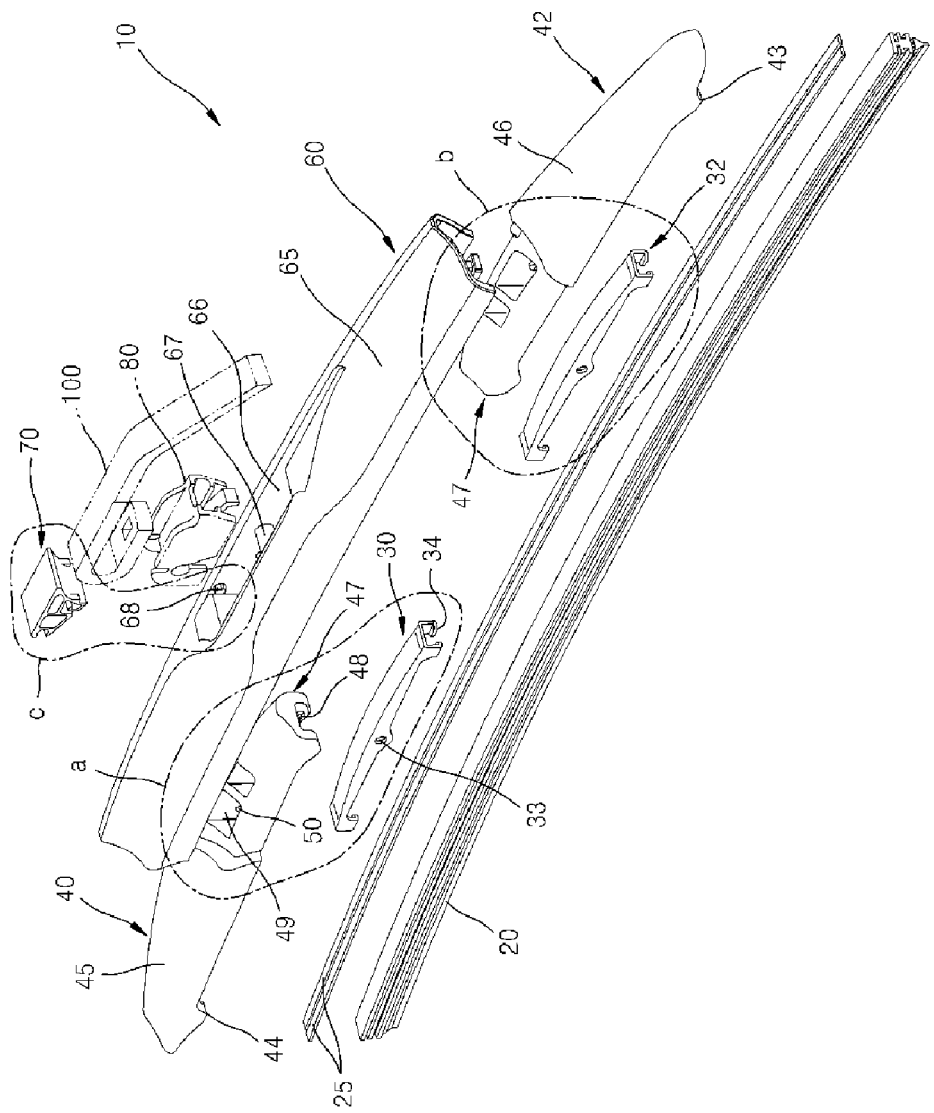
FIG. 1 is a schematic exploded perspective view of a wiper according to an embodiment of the present invention.
Figure 2:
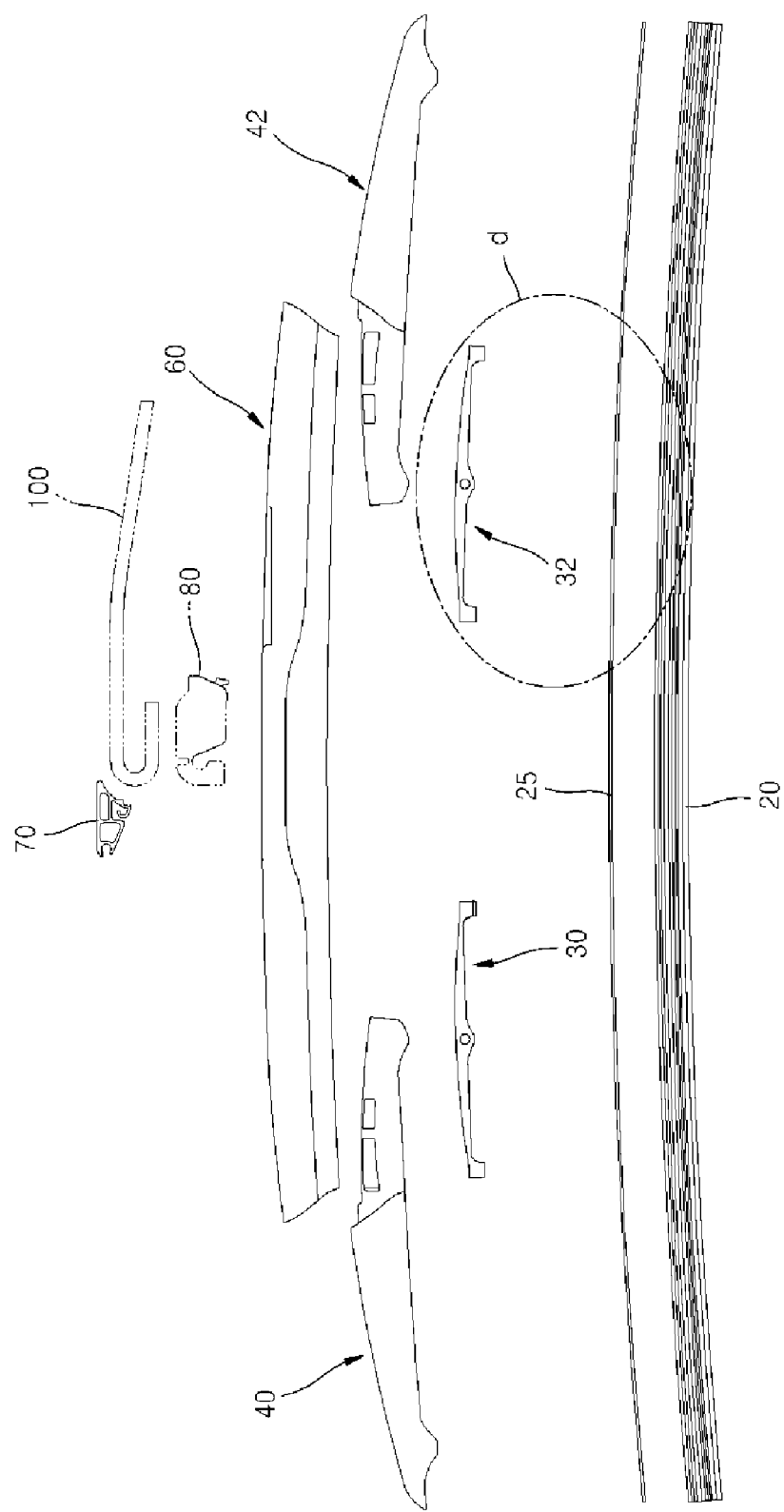
FIG. 2 is another view of the wiper of FIG. 1.
Figure 3:
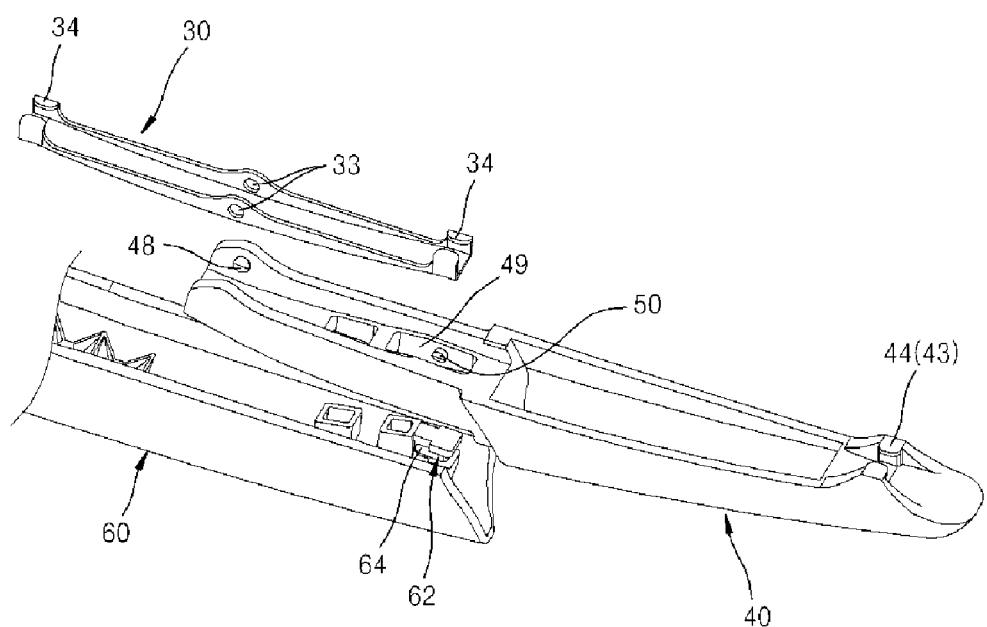
FIG. 3 illustrates an assembling structure of portions a and b illustrated in FIG. 1.
Figure 5:
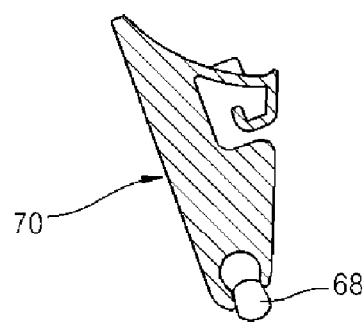
Figure 6:
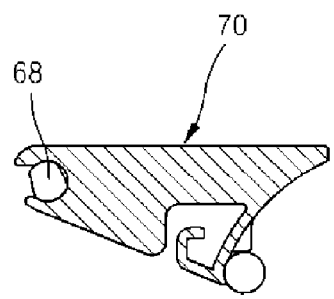
Figure 7:
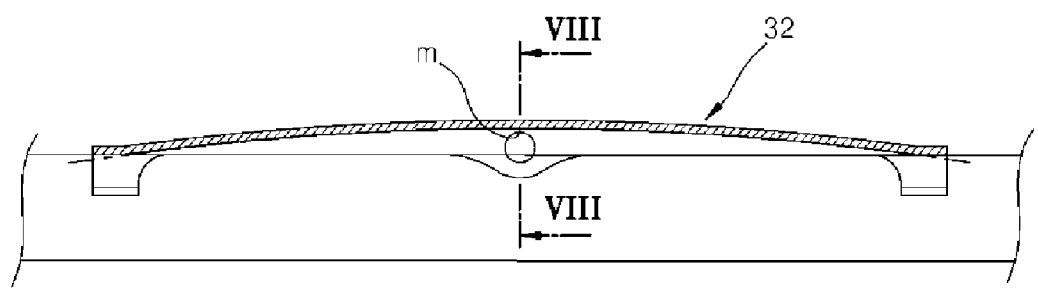
FIG. 7 illustrates a structure of a portion d illustrated in FIG. 2.
Figure 8:
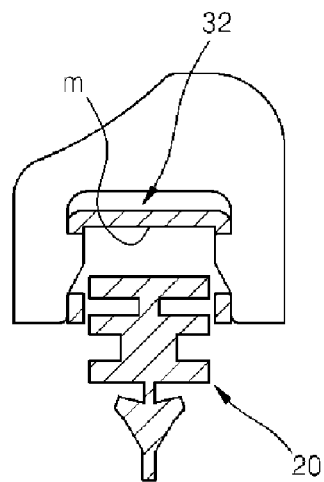
FIG. 8 is a cross-sectional view taken along a line VIII-VIII of FIG. 7.

FIG. 1 is a schematic exploded perspective view of a wiper according to an embodiment of the present invention;

FIG. 1 is a schematic exploded perspective view of a wiper 10 for a vehicle according to an embodiment of the present invention, FIG. 2 is another view of the wiper 10, and FIG. 3 illustrates an assembling structure of portions a and b illustrated in FIG. 1, and FIGS. 4 through 6 illustrate an assembling structure of a portion c illustrated in FIG. 1, and FIG. 7 illustrates a structure of a portion d illustrated in FIG. 2, and FIG. 8 is a cross-sectional view taken along a line VIII-VIII of FIG. 7.

Referring to FIGS. 1 through 8, the wiper 10 according to the current embodiment of the present invention includes a wiper strip 20, a pair of supports 25, a first yoke 30, a second yoke 32, a first auxiliary lever 40, a second auxiliary lever 42, a primary lever 60, and a cover 70.

The wiper strip 20 is disposed in sliding contact with a glass pane of a vehicle and removes foreign substances on the surface of the glass. The wiper strip 20 is generally formed of rubber. The wiper strip 20 includes recesses (not shown) formed in sides of the wiper strip 20 in which the pair of supports 25, which will be described later, are to be combined. The wiper strip 20 used in the present invention is not largely different from a wiper strip used in a conventional tournament type wiper strip and thus, a detailed description thereof will not be provided here.

The pair of supports 25 are combined with the wiper strip 20. The supports 25 are disposed on the wiper strip 20 along a lengthwise direction of the wiper strip 20. The supports 25 have elasticity. Two supports 25 are disposed in the current embodiment, but three or more supports 25 may be disposed instead. The supports 25 are inserted in the recesses formed in the sides of the wiper strip 20 to be combined with the wiper strip 20. The supports 25 give elasticity and rigidity to the wiper strip 20 and are not largely different from those used in a conventional tournament type wiper assembly.

The first yoke 30 slidably supports the supports 25. The first yoke 30 is different from a yoke used in a conventional tournament type wiper assembly. In other words, the first yoke 30 can accommodate the wiper strip 20 and the supports 25. Thus, a problem in which there is a limitation in reducing the overall height of a wiper when a conventional tournament type yoke is used can be solved. The first yoke 30 supports the supports 25 on two ends of the first yoke 30. The first yoke 30 is separated from ends of the supports 25 and supports the supports 25 at positions near the centers of the supports 25 in a lengthwise direction of the supports 25.

The first yoke 30 includes a through hole 33 through which the first yoke 30 is combined with the first auxiliary lever 40. The through hole 33 is formed in a widthwise direction of the first yoke 30. A combination protrusion 48 formed in the first auxiliary lever 40, which will be described later, is elastically combined with the through hole 33. In other words, the through hole 33 is one of components by which the first yoke 30 and the first auxiliary lever 40 are combined with each other.

The second yoke 32 has the same structure as that of the first yoke 30. The second yoke 32 is disposed separate from the first yoke 30. In other words, the second yoke 32 slidably supports the supports 25 on two ends of the second yoke 32. The ends of the first yoke 30 and the second yoke 32 are separated from one another and are separated from the ends of the supports 25 by a predetermined distance. In other words, the first yoke 30 and the second yoke 32 do not support the ends of the supports 25 but support middle portions of the supports 25.

One end of the first auxiliary lever 40 is combined with a middle portion of the first yoke 30 so that the first auxiliary lever 40 may be rotated relative to the first yoke 30. The other end of the first auxiliary lever 40 slidably supports one end of the supports 25. In other words, the first auxiliary lever 40 performs a function similar to the functions of the first yoke 30 and the second yoke 32. In detail, the first auxiliary lever 40 slidably supports one end of the supports 25, thereby performing the same function as that of a third yoke in a conventional tournament type wiper assembly. The first auxiliary lever 40 includes a spoiler 45. The spoiler 45 is integrally formed on a top surface of the first auxiliary lever 40. In detail, the spoiler 45 forms the shape of the top surface of the first auxiliary lever 40. The spoiler 45 causes air that flows toward the glass pane of the vehicle during a wiping operation to push the first auxiliary lever 40 towards the glass pane of the vehicle. The first auxiliary lever 40 includes an extension 47 accommodated in the primary lever 60, which will be described later. The extension 47 includes an accommodation hole 49 in which a protrusion combination portion 62 disposed in the primary lever 60 is accommodated. A protrusion 50 is disposed protruding from inside the accommodation hole 49 toward a protrusion accommodation portion 64 disposed in the protrusion combination portion 62 so that the protrusion 50 may be elastically combined with the protrusion accommodation portion 64.

Also, the combination protrusion 48 is formed on a free end of the extension 47. The combination protrusion 48 protrudes from sidewalls of an inner circumference of the first auxiliary lever 40 toward the through hole 33 so that the combination protrusion 48 may be elastically accommodated in the through hole 33. For example, a pair of combination protrusions 48 may be formed, and the combination protrusions 48 are opposite to each other. The combination protrusion 48 and the through hole 33 are combined with each other so that the first yoke 30 and the first auxiliary lever 40 may be combined with each other in such a way as to be able to be rotated relative to each other.

The second auxiliary lever 42 has a structure symmetrical with respect to the first auxiliary lever 40. In other words, one end of the second auxiliary lever 42 is combined with a middle portion of the second yoke 32 in such a way as to be able to be rotated relative to each other. Another end of the second auxiliary lever 42 is combined with the supports 25 to slidably support one end of the supports 25. A detailed structure of the second auxiliary lever 42 may be the same as that of the first auxiliary lever 40, and thus a detailed description thereof will not be provided here.

The primary lever 60 connects the first auxiliary lever 40 and the second auxiliary leer 42 to each other. One end of the primary lever 60 is combined with the first auxiliary lever 40 in such a way as to be able to be rotated relative to each other. Another end of the primary lever 60 is combined with the second auxiliary lever 42 in such a way as to be able to be rotated relative to each other. In detail, the protrusion combination portion 62 is disposed in each of the ends of the primary lever 60. The protrusion combination portion 62 extends from an upper portion of an inner circumference each of the ends of the primary lever 60 to a lower portion thereof. The protrusion combination portion 62 includes the protrusion accommodation portion 64. The protrusion accommodation portion 64 is formed concavely at a side surface of the protrusion combination portion 62. The protrusion accommodation portion 64 is symmetrical with respect to side surfaces of the protrusion combination portion 62. The protrusion accommodation portion 64 is combined with the protrusion 50 of the accommodation hole 49 so that the primary lever 60 and the first auxiliary lever 40 may be combined with each other in such a way as to be able to be rotated relative to each other. Thus, a bearing for reducing friction between components, unlike in a conventional wiper structure, does not need to be disposed in a portion in which the primary lever 60 and the first auxiliary lever 40 are combined with each other. In detail, a frictional coefficient between the primary lever 60 and the first auxiliary lever 40 formed of plastic is relatively small compared to a frictional coefficient between similar elements in a conventional wiper structure.

An arm combination hole 66 that combines with a wiper arm 100 is formed in the center of the primary lever 60 in a lengthwise direction of the primary lever 60. A clip 80 is combined with the arm combination hole 66. The clip 80 is rotatably assembled with a central axis 67 formed in a widthwise direction of the arm combination hole 66. The wiper arm 100 is assembled with the clip 80. The primary lever 60 is formed by injection molding plastic, such as polypropylene. The primary lever 60 includes a spoiler 65. The spoiler 65 is integrally disposed on the primary lever 60. The spoiler 65 disposed on the primary lever 60 causes air that flows toward the glass pane of the vehicle during a wiping operation to push the primary lever 60 towards the glass pane of the vehicle. The arm combination hole 66 is a hole formed in a vertical direction. A cover combination portion 68 is disposed at sidewalls of the arm combination hole 66. The cover combination portion 68 protrudes from the sidewalls of the arm combination hole 66 in the vertical direction. For example, a pair of cover combination portions 68 may be disposed, and the cover combination portions 68 may protrude from sidewalls of the arm combination hole 66 symmetrically. The cover 70 is combined with the cover combination portion 68. The cover 70 includes a circular hole of which one side is opened so that the cover 70 may be combined with the cover combination portion 68. A cross-section of the cover combination portion 68 is non-circular. In other words, the non-circular cross-section of the cover combination portion 68 tapers in a direction in which the cover 70 is combined with the cover combination portion 68. The tapered cross-section of the cover combination portion 68 gradually increases from a portion smaller than a distance between opened portions of a circular hole of the cover 70 to a portion larger than a distance between the opened portions of the circular hole of the cover 70. The cover combination portion 68 having the tapered structure prevents the cover 70 from easily escaping from the cover combination hole 68 when the cover 70 is combined with the cover combination portion 68.

The wiper arm 100 applies pressure against the glass pane of the vehicle by pressing against the wiper 10 according to the present invention and rotatably connects the wiper 10 to the body of the vehicle.

Hereinafter, the function of the wiper 10 having the structure described above will be described in detail while describing the order of assembling the wiper 10.

First, the order of assembling the wiper 10 will be described with reference of the exploded perspective view of FIG. 1.

Figure 4:
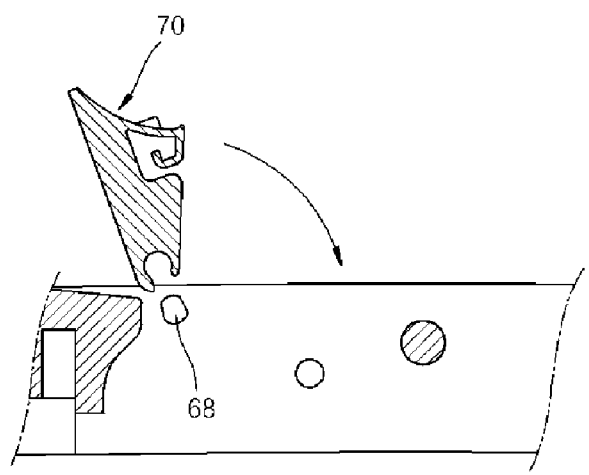
FIGS. 4 through 6 illustrate an assembling structure of a portion c illustrated in FIG. 1.

The first auxiliary lever 40 and the first yoke 30 are rotatably combined with each other. In detail, the combination protrusion 48 disposed on the first auxiliary lever 40 and the through hole 33 disposed on the first yoke 30 are elastically combined with each other. In the same manner, the second auxiliary lever 42 and the second yoke 32 are combined with each other. The primary lever 60 and the first auxiliary lever 40 are rotatably combined with each other. In detail, the protrusion combination portion 62 disposed on the primary lever 60 and the accommodation hole 49 disposed on the first auxiliary lever 40 are elastically combined with each other. In this procedure, the protrusion 50 is elastically accommodated in the protrusion accommodation portion 64 disposed on the protrusion combination portion 62. Thus, the primary lever 60 and the first auxiliary lever 40 are combined with each other in such a way as to be able to be rotated relative to each other. In the same manner, the primary lever 60 and the second auxiliary lever 42 are combined with each other. Now, the clip 80 and the cover 70 are combined with the primary lever 60. In particular, a way to combine the cover 70 with the primary lever 60 will now be described. The opened portions of the circular hole formed in the cover 70 are combined with the cover combination portion 68. In this procedure, since the cross-section of the cover combination portion 68 is non-circular, the cover 70 needs to be combined with the primary lever 60 in a predetermined orientation, as illustrated in FIGS. 4 and 5. Since the cover combination portion 68 has a tapered cross-section, the cover 70 needs to be slightly deformed elastically so that the cover combination portion 68 may enter the circular hole of the cover 70. After the cover 70 is combined with the cover combination portion 68, the cover 70 is then rotated to be fixed on the primary lever 60, as illustrated in FIG. 6.

The supports 25 are combined with the wiper strip 20. A hook 43 disposed on the second auxiliary lever 42, hooks 34 disposed on the first yoke 30 and the second yoke 32, and a hook 44 disposed on the first auxiliary lever 40 are respectively combined with the wiper strip 20 and the supports 25. Then, the wiper arm 100 is combined with the clip 80. Through this procedure, assembling of the wiper 10 is completed. The above-described assembling method is only an embodiment and thus the order of assembling components may be changed.

In the wiper 10 having the structure described above, the number of components is reduced between ½ and ⅔ compared to a conventional wiper and thus manufacturing costs of the components are remarkably reduced. Also, the wiper 10 according to the present invention has a smaller number of components to be assembled. Thus, assembling efficiency of the components is remarkably improved, and the weight of the wiper 10 is reduced. In particular, combination between the first yoke 30 and the first auxiliary lever 40, combination between the second yoke 32 and the second auxiliary lever 42, and combination between the first auxiliary lever 40, the second auxiliary lever 42, and the primary lever 60 are elastically performed due to corresponding shapes of the components so that the components may be assembled without using tools. Thus, assembling efficiency of the components is remarkably improved compared to a conventional wiper. Also, disassembling and assembling of the components are easily performed. Thus, when portions of the wiper 10 are damaged, the wiper 10 can be easily repaired.

Also, the first auxiliary lever 40, the second auxiliary lever 42, and the primary lever 60 are formed of plastic. Thus, the weight of the wiper 10 can be reduced and the wiper 10 does not rust compared to when the first auxiliary lever 40, the second auxiliary lever 42, and the primary lever 60 are formed of metal.

Figure 9:
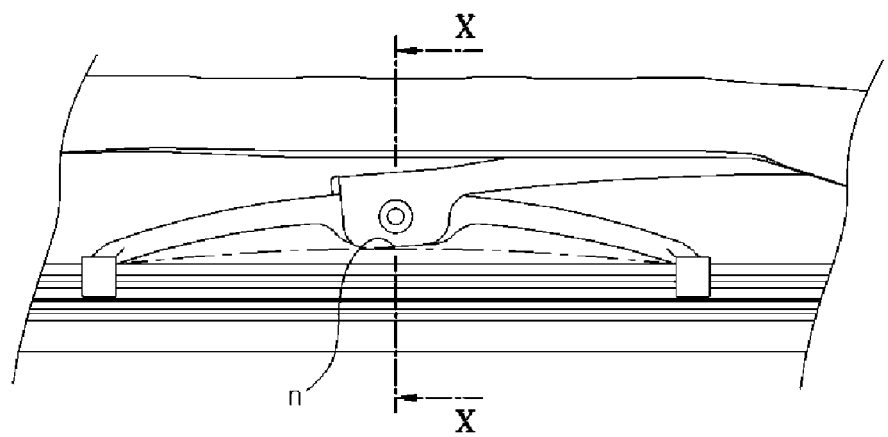
FIG. 9 illustrates a structure of conventional yokes corresponding to FIG. 7.
Figure 10:
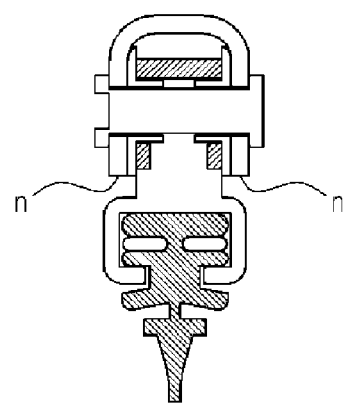
FIG. 10 is a cross-sectional view taken along a line X-X of FIG. 9.

Also, referring to FIGS. 7 and 8, in the structure of the wiper 10 according to the present invention, a rivet is not necessary when the second auxiliary lever 42 and the second yoke 32 are combined with each other. Thus, the supports 25 are inserted in the second yoke 32 so that a moving space can be obtained up to an m-surface of FIG. 7 and the overall height of a blade can be reduced. The structure applies to combination between the first auxiliary lever 40 and the first yoke 30. However, in a conventional wiper, top surfaces of the supports 25 contact an n-surface, that is, a bottom surface of the yoke disposed below the rivet, as illustrated in FIGS. 9 and 10. Thus, there is a limitation in obtaining the moving space. Two-dot dashed lines in FIGS. 7 and 9 are virtual expressions of the maximum rising position of the supports 25.

Also, the first yoke 30 has a structure in which the wiper strip 20 and the supports 25 are accommodated in the first yoke 30. Thus, a problem in which there is a limitation in reducing the overall height of the wiper when the conventional tournament type yoke is used can be solved.

As described above, in the wiper according to the present invention, combination between a yoke and an auxiliary lever and combination between a primary lever and the auxiliary lever are performed simply and thus assembling efficiency of components of the wiper can be improved, the number of the components can be remarkably reduced, and the overall weight of the wiper can be reduced.

Furthermore, the primary lever and the auxiliary lever are formed of plastic so that the effect of reducing the weight of the wiper can be increased. Furthermore, since ends of the auxiliary lever are non-symmetrical with respect to each other, a combination space after the primary lever and the auxiliary lever are assembled with each other, is reduced so that the flow space of the air during driving is reduced and damage of the wiper can be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wiper for a vehicle having improved assembling efficiency and reduced weight, the wiper comprising:
   a wiper strip disposed in sliding contact with a glass pane of a vehicle and for removing foreign substances on the glass pane;
   a plurality of supports combined with the wiper strip, disposed in a lengthwise direction of the wiper strip and having elasticity;
   a first yoke slidably supporting the plurality of supports on ends of the first yoke;
   a second yoke disposed separate from the first yoke and slidably supporting the supports on ends of the second yoke;
   a first auxiliary lever having one end combined with a middle portion of the first yoke in such a way that the first auxiliary lever is able to be rotated relative to the first yoke and another end slidably supporting one end of the supports;
   a second auxiliary lever having one end combined with a middle portion of the second yoke in such a way that the second auxiliary lever is able to be rotated relative to the second yoke and another end slidably supporting one end of the supports; and
   a primary lever having one end combined with the first auxiliary lever in such a way that the primary lever is able to be rotated relative to the first auxiliary lever and another end combined with the second auxiliary lever in such a way that the primary lever is able to be rotated relative to the second auxiliary lever and comprising an arm combination hole in which a wiper arm is combined with a center of the primary lever,
   the first yoke and the second yoke each comprise a through hole by which the first yoke and the second yoke are combined with the first auxiliary lever and the second auxiliary lever, respectively,
   the first yoke and the second yoke accommodate portions of the wiper strip and the supports, and
   a combination protrusion protruding from sidewalls of inner circumferences of the first auxiliary lever and the second auxiliary lever toward the through hole is formed to be elastically accommodated in the through hole;
   a cover combination portion protruding from sidewalls of the arm combination hole; and
   a cover having a hole of which one side to be combined with the cover combination portion is opened,
   wherein a cross-section of the cover combination portion is non-circular, and the non-circular cross-section tapers in a direction in which the cover is combined with the cover combination portion.

2. The wiper of claim 1, wherein the primary lever comprises a pair of protrusion combination portions extending from an upper portion of an inner circumference of the ends of the primary lever to a lower portion thereof, and the first auxiliary lever and the second auxiliary lever each comprise an accommodation hole in which the protrusion combination portion is accommodated.

3. The wiper of claim 2, wherein the pair of protrusion combination portions each comprise:
   a protrusion accommodation portion formed concavely at a side surface of one protrusion combination portion; and
   a protrusion protruding from a side surface of the accommodation hole toward the protrusion accommodation portion.

* * * * *